United States Patent
Pedersen

(10) Patent No.: US 10,326,870 B2
(45) Date of Patent: Jun. 18, 2019

(54) HEADSET SYSTEM FOR USE IN A CALL CENTER ENVIRONMENT

(71) Applicant: GN Netcom A/S, Ballerup (DK)

(72) Inventor: Thomas Pedersen, Gorlose (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 15/821,256

(22) Filed: Nov. 22, 2017

(65) Prior Publication Data

US 2018/0097922 A1 Apr. 5, 2018

Related U.S. Application Data

(63) Continuation of application No. 14/965,442, filed on Dec. 10, 2015, now abandoned, which is a (Continued)

(30) Foreign Application Priority Data

Mar. 30, 2012 (EP) .................................... 12162527

(51) Int. Cl.
*H04M 1/05* (2006.01)
*H04M 1/60* (2006.01)
*H04M 1/725* (2006.01)

(52) U.S. Cl.
CPC ........... *H04M 1/6066* (2013.01); *H04M 1/05* (2013.01); *H04M 1/72513* (2013.01)

(58) Field of Classification Search
None
See application file for complete search history.

(56) References Cited

U.S. PATENT DOCUMENTS 6,650,701 B1 * 11/2003 Hsiang ............... H03H 21/0012
375/232
2005/0202857 A1 * 9/2005 Seshadri ................. H04M 1/05
455/575.2
(Continued)

FOREIGN PATENT DOCUMENTS

EP 1443737 8/2004
WO WO 2008/072815 6/2008

OTHER PUBLICATIONS

Quick start guide, Cisco, 2011 https://www.cisco.com/c/dam/en/us/td/docs/voice_ip_comm/nneetingplace/8_5/english/quickstart_guides/qgphonemp85.pdf (Year: 2011).*
(Continued)

*Primary Examiner* — Jianxun Yang
(74) *Attorney, Agent, or Firm* — Altera Law Group, LLC

(57) ABSTRACT

A headset system for use with especially in a call center environment, in which method a wireless connection is established between headset and base unit, and the wireless connection is maintained while indicating from a headset user interface to the base unit that the headset is available for receiving an incoming call. The headset system is connected to a telephone system and has a processor configured to receive mode information and to operate according to the received mode information. The headset has a headset user interface and controls the headset signal processor to operate in accordance with user input. The headset is further configured to provide the end-of-call information to the base unit while maintaining the wireless connection.

16 Claims, 6 Drawing Sheets

Related U.S. Application Data continuation of application No. 13/851,472, filed on Mar. 27, 2013, now abandoned.

(56) References Cited

U.S. PATENT DOCUMENTS

| | | | |
|---|---|---|---|
| 2005/0245292 A1 | 11/2005 | Bennett et al. | |
| 2006/0089175 A1 | 4/2006 | Yun et al. | |
| 2007/0004473 A1 | 1/2007 | Clark et al. | |
| 2007/0055497 A1* | 3/2007 | Kimijima | G10L 21/0272 704/200.1 |
| 2008/0132294 A1* | 6/2008 | Bennett | H04B 1/1615 455/569.1 |
| 2010/0197227 A1* | 8/2010 | Heo | H04R 1/1041 455/41.2 |
| 2010/0329441 A1* | 12/2010 | Smith | H04M 3/382 379/207.11 |
| 2011/0263235 A1 | 10/2011 | Kassiedass | |
| 2013/0157575 A1 | 6/2013 | Rothschild | |

OTHER PUBLICATIONS

Plantronics Headset solutions for Cisco, Plantronics, 2008 https://www.clarosoftware.com/pdfs/Plantronics%20Headset%20Range.pdf (Year: 2008).*

Quick Start guide, Cisco, 2011; http://www.cisco.com/c/dam/en/us/td/docs/voice_ip_comm/meetingplace/8_5/english/quickstart_guides/qgphonemp85.pdf.

Plantronics Headset solutions for Cisco, Plantronics, 2008; https://www.clarosoftware.com/pdfs/Plantronics%20Headset%20Range.pdf.

Office Action received for the corresponding European application No. 12162527.1 dated Apr. 26, 2018.

* cited by examiner

HEADSET SYSTEM FOR USE IN A CALL CENTER ENVIRONMENT

TECHNICAL FIELD

The invention relates to headset systems, and especially to wireless headset systems, configured to be used in call center environments and especially to such wireless headset systems configured to be used with call center software. Furthermore, a method of operating a wireless headset system in a call center environment is provided.

BACKGROUND

A growing number of businesses use call centers to handle interactions with customers. The call centers use groups of agents to handle all inbound and outbound calls. Companies typically use call center services, for example, as a help desk for banks, service providers, and others, or to manage outbound and inbound communication campaigns to potential customers for telemarketing or to existing customers for collecting information or customer follow-up.

In a call center, there may thus be numerous incoming lines and a number of call center agents ready to answer the incoming calls. To efficiently answer incoming telephone calls, the incoming calls are placed in a queue and answered by a call center agent, typically after a waiting period, and likewise for outbound calls.

To increase the efficiency of the call center agents, typically a caller is asked to enter information, such as telephone number, account information, etc., before the call is transferred to the call center agent. The caller may also be transferred to post-processing of the call, e.g. to provide an evaluation of the quality of the service the call center agent provided. Furthermore, a call may be monitored for quality, supervision or training purposes.

The call center management software implementing the call center may be very complex and multifunctional, however, typically, standard phones or headsets are connected to the call center software for the agents to communicate via the call center management software and the routing of inbound and outbound calls is typically implemented using basic circuit switching.

The call center agents and the call center management software typically communicates using the call states of the telephone, such as the hook states of a standard desk phone, an IP telephone system, etc. being connected to or forming part of the call center management software. Using the hook states, the call center management software may distribute further calls to agents e.g. as soon as the state switches from "hook off", i.e. busy, to "hook on", i.e. available.

In call centers, headsets may be advantageous for the call center agents, to allow for e.g. simultaneous use of a computer system, however, answer delay times may be increased.

SUMMARY OF INVENTION

It is an object of the present invention to provide a headset system, and especially a wireless headset, to be used in a call center environment.

According to a first aspect of the invention, a wireless headset system for use with a telephone system is provided. The headset system may comprise a headset and a base unit, and the base unit may be configured to connect to a telephone system and may comprise a transceiver configured to communicate wirelessly with the headset, a processor configured to receive mode information, and a control unit for controlling the processor to operate according to the received mode information.

The headset may comprise a transceiver configured to communicate wirelessly with the base unit and the transceiver may be connected to a headset control unit configured to control a speaker transducer, a microphone transducer and a signal processor configured to process audio signals. The headset control unit may further be configured to receive user input via a headset user interface and to control the signal processor to operate the headset in accordance with user input.

The received mode information may comprise call center mode information in which mode the base unit transceiver is controlled to maintain a wireless connection with the headset transceiver. Furthermore, the user input may include end-of-call information, so that the headset control unit further may be configured to provide the end-of-call information to the base unit while maintaining the wireless connection.

In another aspect of the present invention, a method of operating a wireless headset system in a call center environment is provided, the wireless headset system comprising a headset and a base unit, the method comprising the steps of establishing a wireless connection between the headset and the base unit, and maintaining the wireless connection while indicating from a headset user interface to the base unit that the headset user is available for receiving an incoming call.

Typically, the call center telephone system is a software based telephone system, such as e.g. VoIP based call center management software, and the call center may act as a customer support center, a VoIP service provider, an interactive e-commerce server, a centralized client information management server, etc.

Generally, the headset system comprises a base unit and a headset, and the headset may communicate wirelessly with the base unit, such as via a standard wireless protocol, such as for example DECT or Bluetooth. The base unit may be configured to interconnect the headset and the call center telephone system, such as by connecting to a computer on which the call center management software is implemented.

The mode information may be information describing the mode in which the headset system should work. The mode information may be entered on the base unit, for example via a base unit user interface, such as a multi-function button, such as by using push buttons, wheels, or a software interface, or the mode information may be received from the telephone system to which the headset system is connected.

The mode information may include instructions as to how the base unit communicates with the headset. The mode information may for example include a regular mode, to be used when the headset is used in a standard office environment with the headset system connected to either a desk phone, a software implemented telephone, etc. In this regular mode, the headset user interface may allow for inter alia receiving and ending calls or conversations by sending hook-off and hook-on signals to the base unit.

The mode information may furthermore include a call center mode in which the base unit transceiver is controlled to maintain a wireless connection with the headset transceiver. The wireless connection may be maintained as long as the telephone system connection is active, until an end-of-session signal is received, etc. The base unit may be configured to receive an end-of-session signal before terminating the wireless connection between the headset transceiver and the base unit transceiver.

The wireless connection may be maintained for a given period of time, and/or from a maintain signal, or start-of-session signal, is received in the base unit and until an end-of-session signal, or a disconnect signal, is received in the base unit. For example, the wireless connection may be maintained as long as the agent is logged-in to a call center management system, so that for example, a maintain signal is sent to the base unit upon agent log-in and an end-of-session signal is sent upon agent log-out. Alternatively, the connection may be maintained as long as the headset is lifted from the base unit cradle. Thereby, a start-of-session signal may be sent when the headset is lifted from the base unit cradle, prompting the wireless connection, and an end-of-session signal may be sent upon re-placing the headset in the base unit cradle, terminating the wireless connection.

It is an advantage of maintaining the wireless connection between the headset and the base unit while receiving and ending calls via a call center management system that the set-up time for setting up the wireless connection between headset and base unit is eliminated. Typically, a user or agent using a wireless headset will experience a slight delay from picking up the headset and till the connection to the caller is established. This set-up delay, or answer time delay, of about 1 second, such as about 0.9 seconds to 1.5 seconds, may be tolerable in standard office use, where the calls are less frequent. However, in a call center environment, such a delay is critical in maintaining a high throughput and may frequently be the decisive reason as to why a wireless headset system is not implemented for use in a call center, despite the mobility advantages such wireless headset systems provide.

The headset user interface may be implemented using push buttons or wheels, the headset user interface may be a multi-function button, and/or the headset user interface may be a software based user interface.

In the call center mode, the headset user interface may allow the agent to ask for a further call to be routed to said agent and thereby allow the agent to control the rate of incoming calls, that is the agent may send a command to request for the next caller in the queue to be routed to his headset system. Thus, the user input may comprise a request for a next call from the telephone system.

Alternatively, the headset system may be configured to accept incoming calls as they arrive, typically, the call center management software will be providing a fixed time after the call center management software has registered that an agent has finished a call, before a next call is routed to the agent. Thus, having a headset system wherein the wireless connection may be maintained while at the same time enabling the headset user interface to communicate with the base unit, and especially to communicate end-of-call signals to the base unit, results in an improved user experience.

The headset control unit may be configured to control the signal processor to reset audio parameters upon receiving end-of-call information. The audio parameters may include call quality settings, signal attenuation, speaker gain, echo, microphone transducer adjustments, speaker transducer adjustments, and audio filter control, etc. The audio parameters may dynamically be adapted to optimise the quality of each incoming call. Typically, this dynamical adaptation is performed as the call is initiated. It is an advantage of resetting the audio parameters upon receiving the end-of-call information, or the next-caller-in-queue command, in that the next call may be adjusted from the reset audio parameters, thereby avoiding the situation in which a call having extreme audio parameter settings influence the duration of the dynamical adaptation procedure. The audio parameters may be reset to predetermined median values. Thereby, the audio parameters for each incoming call will have the same median start values, and high tones and/or delays in performing the dynamical adaptation may be substantially avoided.

The method of operating a wireless headset system in a call center environment is provided, wherein the method comprises the steps of establishing a wireless connection between the headset and the base unit, and maintaining the wireless connection. The method may further comprise the step of maintaining the wireless connection while indicating from a headset user interface to the base unit that the headset user is available for receiving an incoming call. In one or more embodiments, the method may comprise resetting headset audio parameters upon indicating that the headset user is available for receiving an incoming call. Thus, when receiving the indication in the base unit that the headset user is available for receiving an incoming call, the base unit may be configured to reset the audio parameters.

In one or more embodiments, wherein the base unit comprises a transceiver configured to communicate wirelessly with a headset transceiver, the method may further comprise the steps of, in the base unit, receiving call-center mode information in a base unit processor, controlling the processor to operate according to the received call-center mode information, and maintaining a wireless connection between a headset transceiver and a base unit transceiver. The method may additionally or alternatively, comprise the steps of, in the headset, controlling a speaker transducer, a microphone transducer and a signal processor configured to process audio signals via a headset control unit, receiving in the headset control unit user input provided via a headset user interface and controlling the signal processor to operate the headset in accordance with user input. An end-of-call information may be provided to the base unit while maintaining the wireless connection upon receiving a user input including end-of-call information.

In one or more embodiments, the method may further comprise the step of resetting audio signal parameters in the signal processor upon receiving end-of-call information and in a preferred embodiment, the audio signal parameters are reset to predetermined median values.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTION OF THE DRAWINGS

Figure 1:
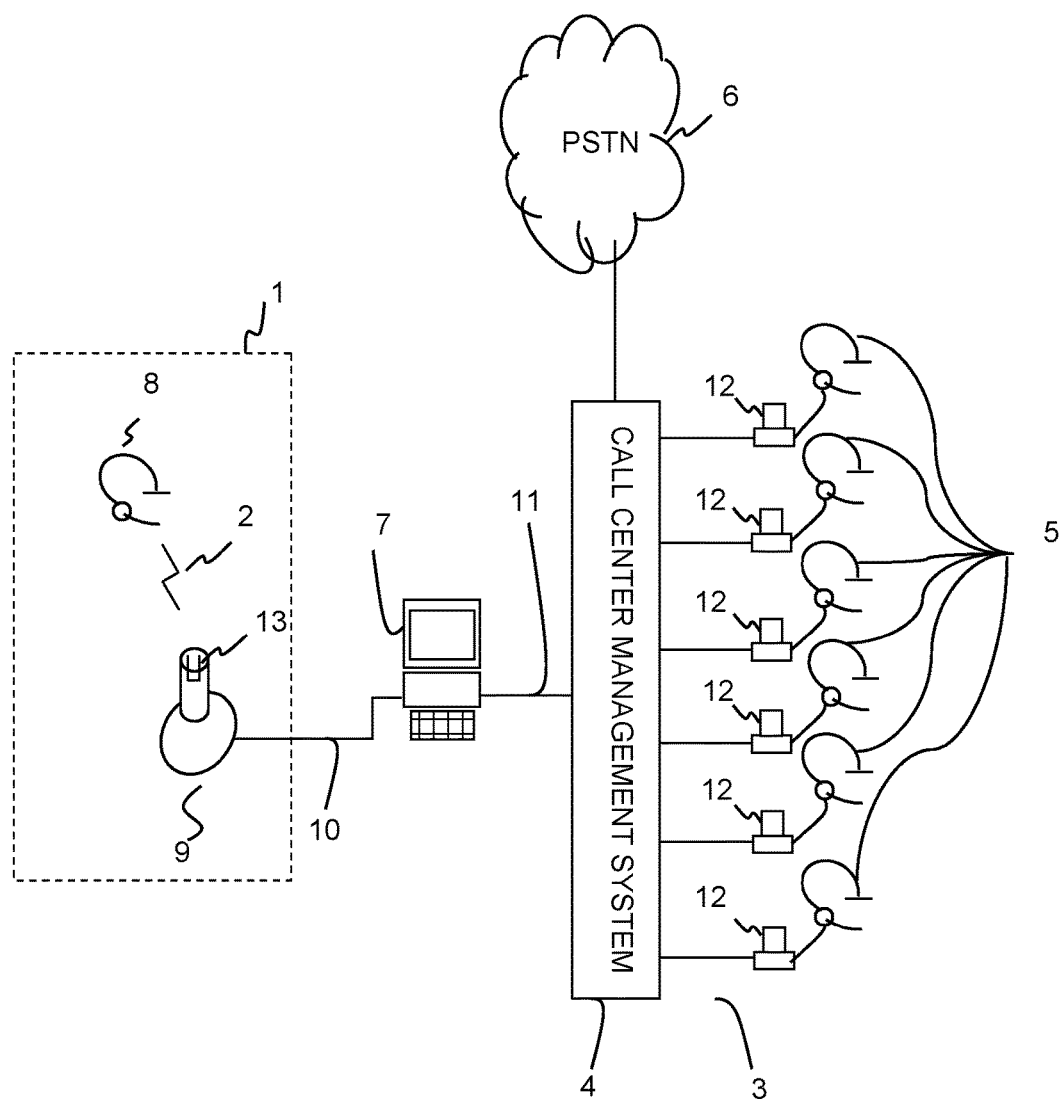
FIG. 1 shows schematically a call center system with connected headsets.

In FIG. 1, a headset system 1 for use with a telephone system is shown 3. The telephone system is a call center management system 3, implemented on a server 4 and a plurality of agent computers 7, 12. The call center management system 3 connects a plurality of agents, each agent connected to the call center management system via a computer 5. The plurality of agents may receive incoming calls via the PSTN or any other telephone network 6, or place outbound calls through the telephone network 6. The telephone network may also be implemented via a computer network, such as the internet.

Typically, such call center management systems 3 use a queuing system allowing the systems to queue their customers' requests until free resources become available. This means that if traffic intensity levels exceed available capacity, customer's calls are not lost; customers instead wait until they can be served. Thus, customers are queued while waiting for the next available agent. Often, the queue is ordered according to the first-in first-out principle in which customers are served one at a time and the customer that has been waiting the longest is served first. However, also other queuing principles may be used, e.g. using a priority queuing system in which customers with high priority are served first. Classic queuing theory involves complex calculations to determine for example waiting time, service time, server utilization and other metrics that are used to measure queuing performance. Typically, call center management systems also requires a customer to key in particular information before the call is being routed to a call center agent.

This information may comprise account information, client reference numbers, telephone numbers, etc. The costumer is typically also led through an extensive menu program to direct the customer to the correct agent. Furthermore, after a call, the customer or caller may be transferred to post-processing of the call, e.g. to provide an evaluation of the quality of the service the call center agent provided. Furthermore, a call may be monitored for quality, supervision or training purposes.

It is readily seen that the call center management software is an advanced and complex software system. However, the interface towards the agents, whether headset systems or handsets are used, is typically implemented using basic circuit switching. Thus, communication between the call center management software and the agents or the headset/handsets of the agents, is limited to simple signals, such as hook-off and hook-on signals.

The call center management system is connected to an agent computer 7, 12 on which an IP telephone system is installed. The agent computers 7, 12 are connected to headset systems 1, 5. It is envisaged that also a regular telephone device may connect to the call center management system 3.

The agent computer 7 is connected to a headset system 1. The headset system 1 comprises a headset 8 and a base unit 9 connected via wireless communication connection 2. The base unit 9 is connected to the agent computer 7 via line 10, the agent computer 7 connecting to the call center management system 3 via line 11. The base unit has a cradle 13 for receiving the headset 8, e.g. for charging of the headset 8.

Figure 2:
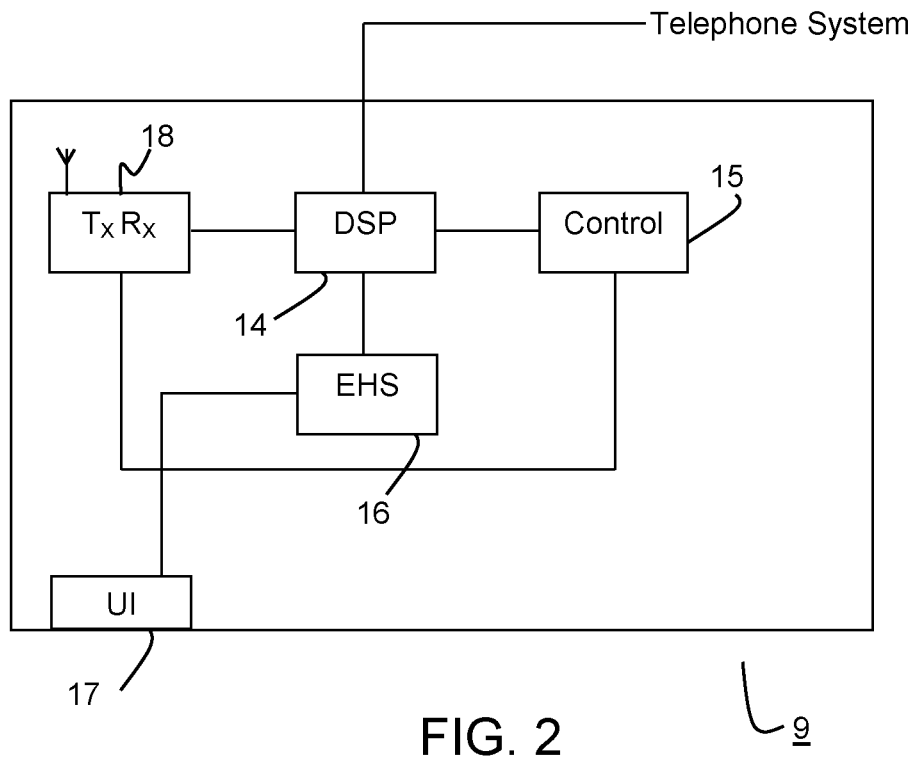
FIG. 2 shows schematically a base unit.

In FIG. 2, a base unit 9 is shown schematically. The base unit 9 comprises a transceiver 18 configured to communicate wirelessly with the headset 8, a processor 14, such as a Digital Signal Processor, configured to receive mode information, and a control unit 15 for controlling the processor 14 to operate according to the received mode information. The transceiver 18 is connected to processor 14 for communicating data between the base unit 9 and the headset 8. The base unit 9 may further comprise an electronic hook switch adapter 16. The electronic hook switch adapter may be connected either directly to the transceiver or it may be connected to the transceiver via the processor 14. The electronic hook switch adapter 16 allows for communication of data between the base unit 9 and the headset 8 relating to audio and voice in particular, including audio parameters, and the data may also comprise control commands, such as control commands for establishing and disconnecting a telephone connection, adjusting a volume or muting a connection, or any other functionality provided with the electronic hook switch system, or any combination(s) thereof. The electronic hook switch adapter 16 is an electronic solution that enables remote operation of compatible wireless headsets, such as headset 8, with various telephone systems. Hereby, the need for a mechanical handset lifter is eliminated. It is an advantage that as mobility within the working environment continues to increase, the users have the possibility of remotely controlling an associated telephone device, such as a desktop telephone or an IP soft phone or a telephone system implemented in a call center management software.

Figure 3:
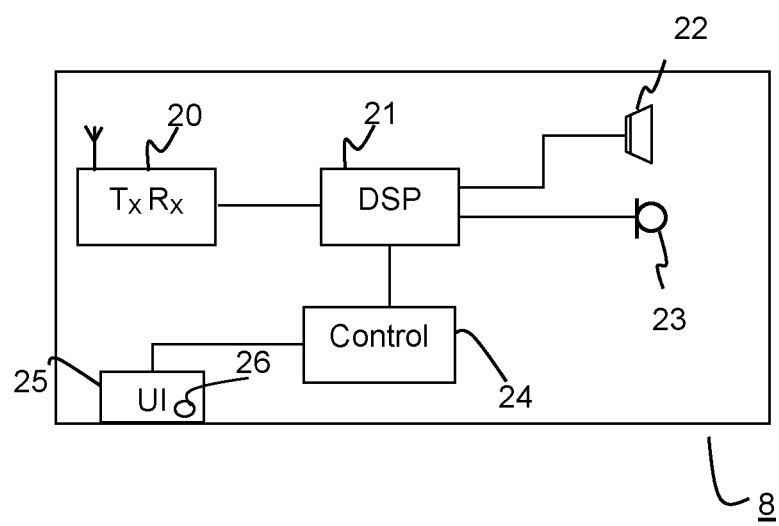
FIG. 3 shows schematically a headset.

In FIG. 3, a headset 8 is shown schematically comprising a transceiver 20 configured to communicate wirelessly with the base unit 9, via base unit transceiver 18, and connected to a headset control unit 24, such as a control circuit or a processor, configured, i.e. programmed or wired, to control a speaker transducer 22, a microphone transducer 23 and a signal processor 21 configured to process audio signals, the headset control unit 24 further being configured to receive user input via a headset user interface 25 and to control the signal processor 21 to operate the headset 8 in accordance with user input. The signal processor 21 and the control unit 24 may be implemented in one processor unit.

The mode information received in the base unit 9 comprises a call center mode information in which mode the base unit transceiver 18 is controlled to maintain a wireless connection 2 with the headset transceiver 20, and wherein the user input includes end-of-call information, the headset control unit 24 further being configured to provide the end-of-call information to the base unit 9 while maintaining the wireless connection 2 intact.

Figure 4:
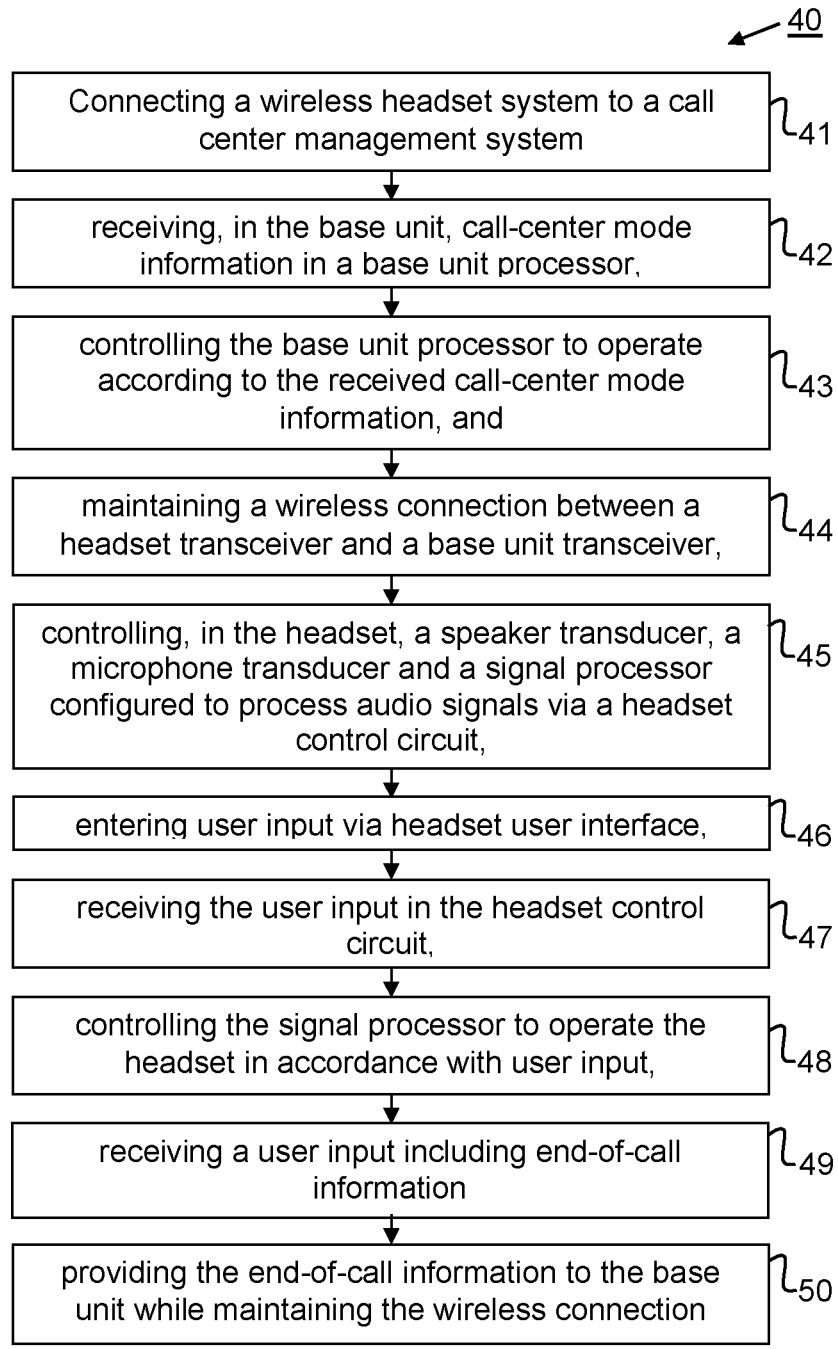
FIG. 4 shows a flow chart of a method of operating a wireless headset system in a call center environment.

FIG. 4 shows a flowchart of a method 40 of operating a wireless headset system 1 in a call center environment, the wireless headset system 1 comprising a headset 8 and a base unit 9. In step 41, the connection between the headset system and the call center management system is activated. The connection may be activated by e.g. lifting the headset 8 out of the base unit cradle 13, by agent log-in to the call center software, etc. In step 42, call-center mode information is received in a base unit processor 14. The base unit processor is controlled to operate according to the received call-center mode information, in step 43, and a wireless connection is maintained between a headset transceiver and a base unit transceiver in step 44. In step 45, the headset control unit controls the speaker transducer, the microphone transducer and the signal processor configured to process audio signals. In step 46, user input is entered via a headset user interface e.g. by an agent, and in step 47, the user input is received in the headset control unit. The signal processor 21 is controlled to operate the headset in accordance with user input in step 48 and in step 49, user input including end-of-call information is received. In step 50, the end-of-call information is provided to the base unit while maintaining the wireless connection.

It is an advantage that the present method of operating the headset that it centers around the behavioural dynamics usually found in the call center environments and thus takes the very different usage pattern and frequency of standard telephony operations such as e.g. hook on/off, ring and mute into account.

Figure 5:
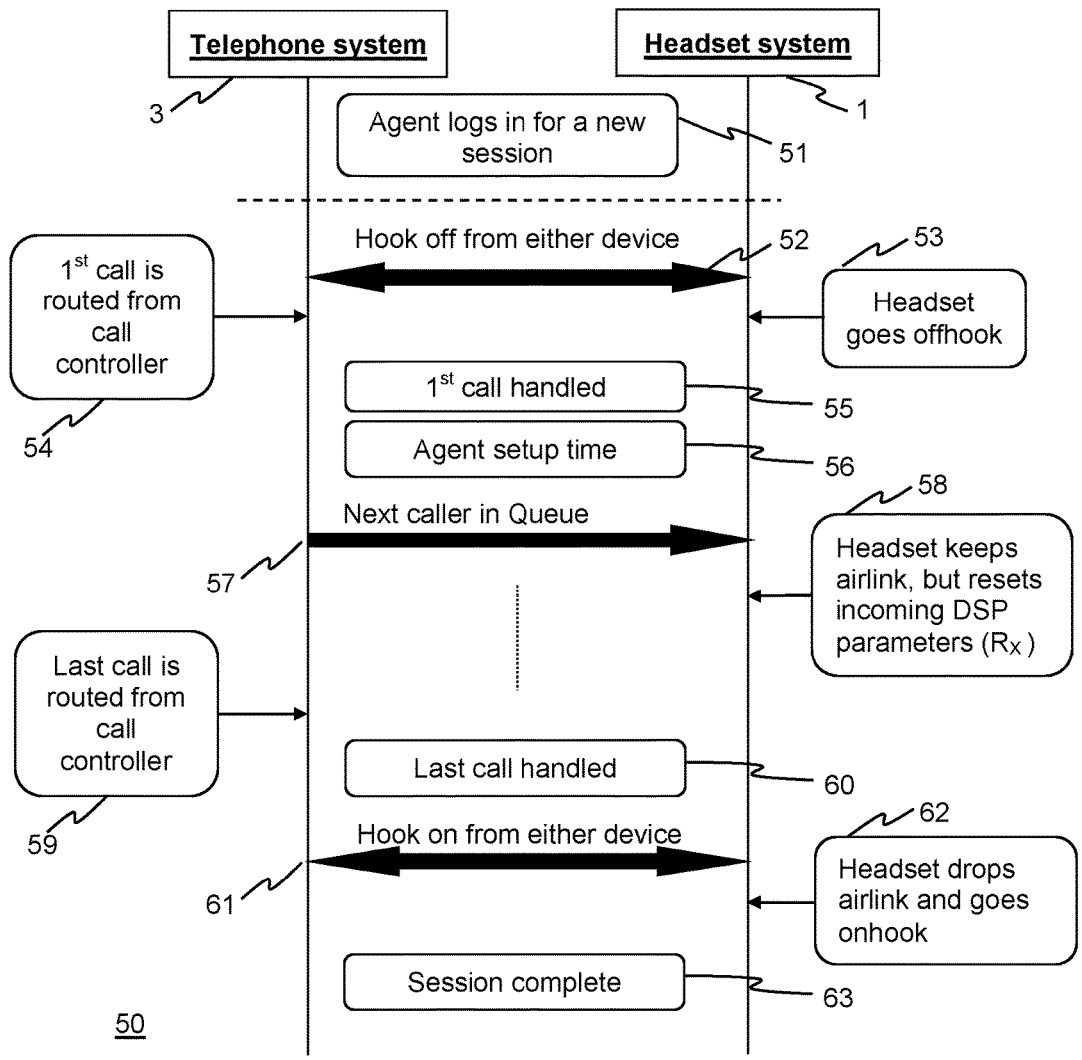
FIG. 5 shows a command sequence between a headset system and a telephone system in one embodiment.

FIG. 5 shows a block diagram 50 describing the sequence of commands between the headset system 1 and the telephone system that is the call center management system 3. The call itself may be handled from a PC or computer screen. In the present example, the set-up time provided after one call is handled and before a next call is routed to the same headset system or agent, is a fixed period of time set by the call center management system. The fixed period of time may be between a couple of seconds and a few minutes depending on the amount of follow up work required on each call.

The first action 51 includes an agent logging in to the call center management system for a new session. Either device, i.e. call center management system 3 or headset system 1, may provide a hook off signal as indicated by 52. In the next step 53, the headset system 1 goes off-hook and the first call is routed from a call controller, forming part of the call center management system 3, to the headset system 1, in 54. In 55, the first call is handled, and the set-up time is indicated in 56. As soon as the set-up time has passed, the next caller in queue is routed from the telephone 3 to the headset system 1, as indicated by 57. The headset system 1 keeps the air link 2, i.e. the wireless connection between the headset and the base unit, and resets incoming DSP or audio parameters (Rx) in step 58. A last call is routed from the call controller 3 to the agent in step 59, and the last call is handled in 60. Hereafter, with no further set-up time, either device may provide a hook on signal as indicated in 61. Upon receiving the hook-on signal, the headset system drops the air link and goes on-hook, step 62. 63 indicates that the session is complete.

Figure 6:
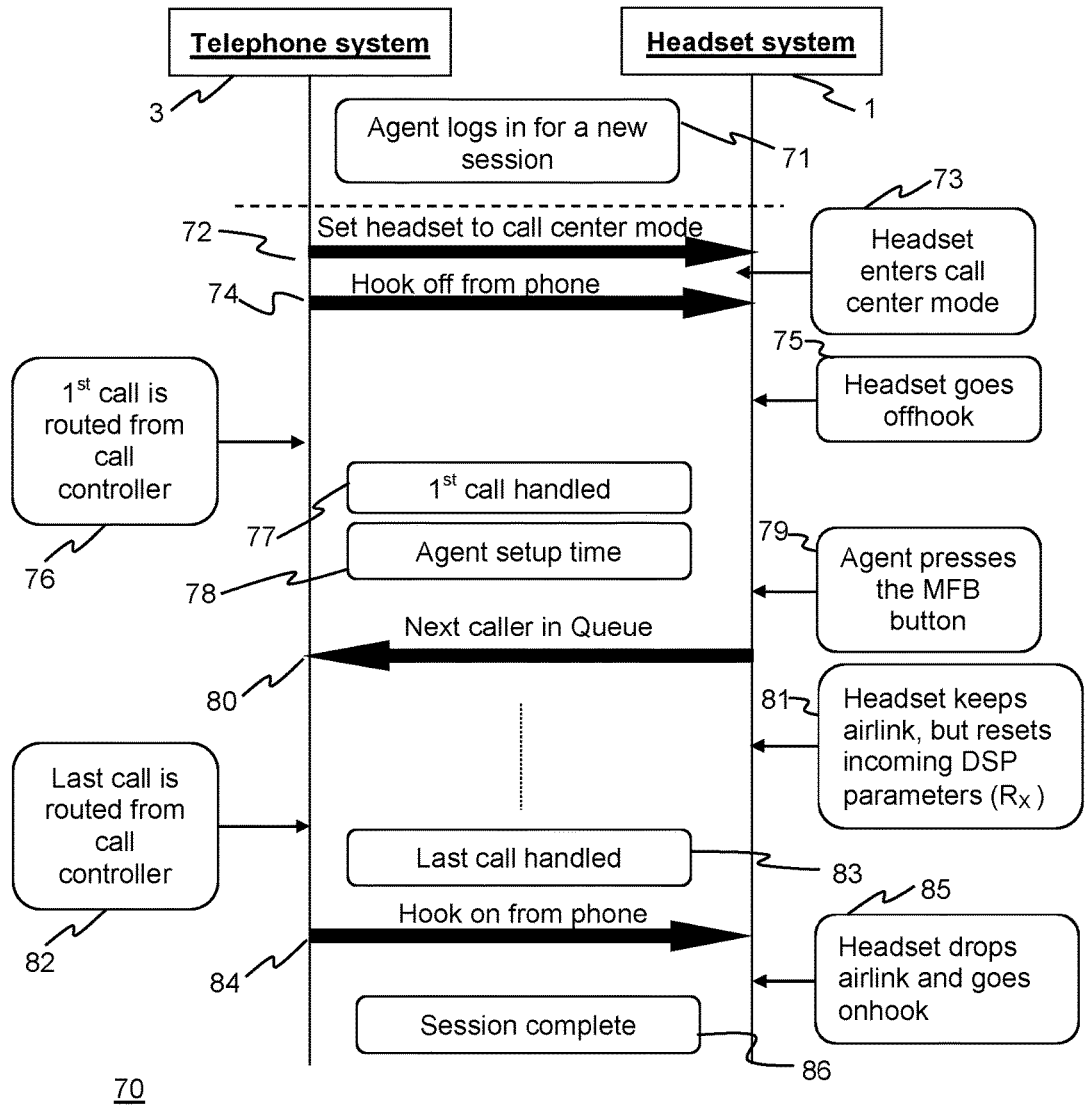
FIG. 6 shows a command sequence between a headset and a telephone system in another embodiment.

In FIG. 6, a block diagram 70 shows a sequence of commands between the headset system 1 and the telephone system (phone) that is the call center management system, 3. The call may be handled locally from a PC or computer screen. In the present example, the headset 8 comprises a user interface 25 having a Multi-Function Button 26 allowing an agent to decide when the next caller should be routed to his local PC. Thus, the set-up time is variable and provided after one call is handled and before a next call is routed to the same headset system or agent. The fixed period of time may be between a couple of seconds and a few minutes depending on the amount of follow up work required on each call.

The first action 71 includes an agent logging in to the call center management system for a new session. A command 72 is sent from the call center management system 3 to set the headset system 1 to operate in call center mode. In step 73, the headset enters call center mode. A hook-off command 74 is sent from the telephone system 3 to the headset system 1. The headset system 1 goes off-hook in step 75 and an air link, such as a wireless connection 2, may be established between the telephone system 3 and the headset system 1. In the next step 76, the first call is routed from a call controller, forming part of the call center management system 3, to the headset system 1. In 77, the first call is handled, and the variable set-up time is indicated in 78. When the agent is ready to receive a next call, the agent presses the Multi-Function-Button, step 79, which sends a command 80 to the telephone system, requesting that the next caller in queue is routed to the agent. In step 81, the headset 3 system keeps the air link, i.e. the wireless connection between the headset and the base unit, and resets incoming DSP or audio parameters (Rx) in step 58. A last call is routed from the telephone system 3 to the agent in step 82, and the last call is handled in 83. Hereafter, the telephone system 3 provides a hook-on command 84 to the headset system 1. Upon receiving the hook-on signal, the headset system 1 drops the air link and goes on-hook, step 85. 86 indicates that the session is complete.

The advantage of this method is clearly seen in that in a standard solution employing a wireless headset, the steps 79 and 80 would require the agent to press the button twice, i.e. to send a hook-on signal and a hook-off signal, and wait for taking down/setting up the audio link 2. This would be time consuming and could amount to 3-5 seconds of production time per call which is quite significant for a call center operator.

But not only is the waiting time for the agent reduced, the process of interpreting the numerous signals sent from the telephone system to the headset system during a call is significantly improved. As mentioned above, the call center management software is an advanced and complex software system connecting to the handsets or headset systems using basic circuit switching. Thus, communication between the call center management software and the agents or the headset/handsets of the agents, is limited to simple signals, such as hook state signals, such as hook-off and hook-on signals. This leads to numerous intermediate hook state signals being sent from the telephone system to the headset system, which are not signals to the headset to hook on or hook off, but rather communications as to the switching of the telephone lines between agents, from one or more queues to agents, switching from an agent to post processing of the call, etc. If all these signals are not interpreted correctly as intermediate hook state signals, there is a risk of untimely disconnecting a telephone call.

Figure 7:
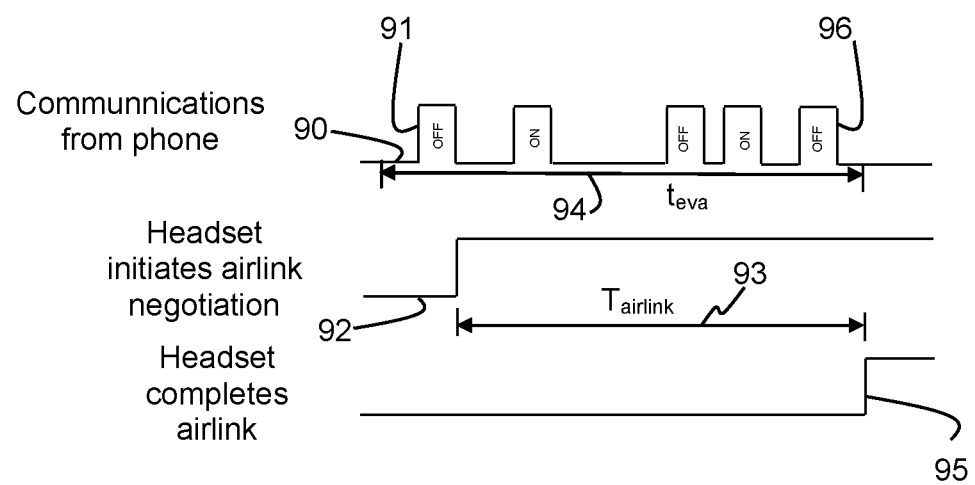
FIG. 7 shows an example of hook state signals provided to the headset system.

This process is illustrated in FIG. 7 showing an example of hook state signals provided to the headset system. A stream 90 of hook state signals is provided from the telephone system to the headset system. Upon receiving the first hook off signal 91, the headset initiates air link negotiation and provides a wireless connection between the headset and the base unit. In the present example, the air link is maintained for a predetermined time of $T_{airlink}$ 93. The stream of hook states is evaluated, and, in the present example, all hook state signals provided in a time frame $t_{eva}$ 94 are analysed. If the first hook state signal 91 in the time frame $t_{eva}$ corresponds to the last hook state 96 in the time frame $t_{eva}$ then no hook state change is performed as illustrated in FIG. 7, and the air link as shown in 95 is disconnected only after the predetermined time $T_{airlink}$ 93. It is obvious that this procedure is vulnerable and makes the overall call center management system vulnerable to lost calls. As lost calls are a significant and highly weighted risk factor in a call center management system, this communication of hook states is undesirable. It is therefore a further advantage of the present invention that intermediate hook switch signals are not communicated to the headset system, as the hook state is fixed on "hook off" as long as the headset system is actively connected to the call center management system.

The invention claimed is:

1. A multi-function headset system for use with a telephone system connectable to an outside phone line, usable in at least two fully operational modes, a regular mode of operation and a call center mode of operation, the multi-function headset system comprising;
a headset and a base unit; a call center system providing the base unit with a plurality of successive phone calls via the telephone system; an electronic hook switch adapter allowing for communication of data between the base unit and the headset;
the base unit being configured to connect to a telephone system and including: a transceiver configured to communicate wirelessly with the headset, a mode switch configured to control the headset between at least two modes of operation, wherein both modes the system is always in a ready to operate status; a regular mode, wherein an end of call signal terminates a wireless audio link between the headset and base unit, and a call center mode, wherein and end of call signal maintains said wireless audio link between the base unit and headset even after a prior call is terminated between the base unit and an outside phone line, so that a wireless audio link is immediately is constantly on and ready for a subsequent call,
the headset comprising;
a transceiver configured to communicate wirelessly with the base unit and connected to a headset control unit configured to control a speaker transducer, a microphone transducer and a signal processor configured to process audio signals, the headset control unit further being configured to receive user input via a headset user interface and to control the signal processor to operate the headset in accordance with user input,
wherein in call center mode, information in which mode the base unit transceiver is controlled to maintain a wireless audio link with the headset transceiver even in gap periods between successive phone calls, and wherein the user input includes end-of-call information, the headset control unit further being configured to upon receiving an end-of-call off-hook signal from the telephone system via the base unit, terminates the call while maintaining the wireless audio link without interruption between the headset and base station.

2. The multi-function headset system according to claim 1, wherein the mode of operation is received from the telephone system.

3. The multi-function headset system according to claim 1, wherein the mode of operation is entered by a user via a base unit user interface.

4. The multi-function headset system according to claim 1, wherein the headset includes a plurality of audio configuration parameters which can be user adjusted and wherein when the multi-function headset system is in call center mode of operation, the headset control unit is configured to control the signal processor to reset said audio parameters to a default setting upon receiving end-of-call information even though the wireless audio link has not be terminated from a previous call.

5. The multi-function headset system according to claim 4, wherein the audio parameters include call quality settings.

6. The multi-function headset system according to claim 4, wherein the audio parameters includes signal attenuation, speaker gain, echo, microphone transducer adjustments, speaker transducer adjustments, and audio filter control.

7. The multi-function headset system according to claim 4, wherein the resetting of the audio parameters comprises setting the audio parameters to predetermined median values.

8. The multi-function headset system according to claim 1, wherein the user input comprises a request for a next call from the telephone system.

9. The multi-function headset system according to claim 1, wherein the headset user interface comprises a Multi-Function Button.

10. The multi-function headset system according to claim 1, wherein, in call center mode of operation, the base unit receives an end-of-session signal without terminating the wireless audio link between the headset transceiver and the base unit transceiver, whereas in regular mode of operation, when the base unit receives an end of session signal, the wireless audio link is terminated.

11. A method of operating a wireless headset system with a base unit connectable to an outside phone line, in at least two modes, a first mode being regular mode and a second mode being call center mode capable of maintaining a live audio connection between a headset, a base unit and a phone line, the wireless headset system comprising a headset, an electronic hook switch and a base unit, the method comprising the steps of:
selecting between first and second modes;
in the first mode, establishing a wireless audio link between the headset and the base unit, and maintaining the wireless connection while indicating from a headset user interface to the base unit that the headset is available for receiving an incoming call in the first mode, establishing and terminating a wireless audio link between the headset and base unit in response to an incoming call, said incoming call initially establishing said audio link, and an end of call signal for terminating the wireless audio link and the call via an electronic hook switch;
in the second mode, establishing and terminating a wireless connection between the headset and base unit in response to an incoming call, said incoming call initially establishing said continuous unbroken audio link, and wherein an end of call signal terminates the call between the base unit via said electronic hook switch, and an outside phone line while continuously maintaining an unbroken wireless link active in a fully ready to communicate status without re-establishing the wireless link between the headset and base unit between successive calls even if no call is currently connected to the headset; so that the headset is immediately ready to receive subsequent calls without the need to reestablish a wireless audio link.

12. A method according to claim 11, wherein the headset is user adjustable with respect to audio parameters, and wherein if the wireless headset system is in said second mode, the method further comprises resetting headset audio parameters upon receipt of subsequent incoming calls.

13. A method according to claim 11, wherein the base unit comprises a transceiver configured to communicate wirelessly with a headset transceiver, the method comprising,
in the base unit:
receiving call-center mode information in a base unit processor,
controlling the base unit processor to operate according to the second mode, and continuously maintaining a wireless audio link between a headset transceiver and a base unit transceiver without interruption of the wireless audio link even if there is no active call in progress,
in the headset:
controlling a speaker transducer, a microphone transducer and a signal processor configured to process audio signals via a headset control unit, receiving in the headset control unit user input provided via a headset user interface and controlling the signal processor to operate the headset in accordance with user input, providing an end-of-call information to the base unit while maintaining the wireless audio link upon receiving a user input including end-of-call information.

14. A method according to claim 11, further comprising resetting audio signal parameters in the signal processor upon receiving end-of-call information.

15. A method according to claim 14, wherein resetting the audio signal parameters includes resetting the audio signal parameters to predetermined median values.

16. A multi-function headset system for use with a telephone system connectable to an outside phone line, usable in a regular mode of operation and a call center mode of operation, the multi-function headset system comprising;

a headset and a base unit, a call center system providing the base unit with a plurality of phone calls;

the base unit being configured to connect to a telephone system and including:

a transceiver configured to communicate wirelessly with the headset, a mode switch configured to control the headset between at least two modes of operation, a regular mode, wherein an end of call signal terminates a wireless connection between the headset and base unit, and a call center mode, wherein and end of call signal terminates a prior call between the base unit and an outside phone line while maintaining said wireless audio link between the base unit and headset even if a call is terminated, so that a wireless audio link is immediately ready for a subsequent call in a fully ready to communicate status without re-establishing a wireless audio link between the headset and base unit between calls, the headset comprising:

a transceiver configured to communicate wirelessly with the base unit and connected to a headset control unit configured to control a speaker transducer, a microphone transducer and a signal processor configured to process audio signals, the headset control unit further being configured to receive user input via a headset user interface and to control the signal processor to operate the headset in accordance with user input, wherein a mode of operation comprises a call center mode information in which mode the base unit transceiver is controlled to maintain a wireless audio link with the headset transceiver, and wherein the user input includes end-of-call information, the headset control unit further being configured to provide the end-of-call information to the base unit while maintaining the wireless audio link, and wherein the headset further includes a plurality of audio configuration parameters which can be user adjusted and wherein in the call center mode of operation, the headset control unit is configured to control the signal processor to reset said audio parameters to a default setting upon receiving a subsequent call even though the wireless audio link has not be terminated from a previous call.

* * * * *